US005749566A

United States Patent [19]
Vitale et al.

[11] Patent Number: 5,749,566
[45] Date of Patent: May 12, 1998

[54] SELF COMPENSATING FLUID SPRING ASSEMBLY

[76] Inventors: Ralph Vitale; Frank Vitale, both of 164 Beacon Ave., New Haven, Conn. 06512

[21] Appl. No.: 646,044

[22] Filed: May 7, 1996

[51] Int. Cl.⁶ ........................................ F16F 9/04
[52] U.S. Cl. ........................... 267/64.23; 267/64.27
[58] Field of Search ........................... 267/64.23, 64.27, 267/64.28; 280/698, 711, 714, 6.1

[56] References Cited

U.S. PATENT DOCUMENTS

| | | | |
|---|---|---|---|
| 1,459,892 | 6/1923 | Hughes | 267/64.27 |
| 4,786,035 | 11/1988 | Elliott | 267/64.27 X |
| 4,982,937 | 1/1991 | Eckel et al. | 267/64.28 X |
| 5,199,690 | 4/1993 | Marshall | 267/64.28 X |
| 5,388,849 | 2/1995 | Arsenault et al. | 267/64.27 X |

FOREIGN PATENT DOCUMENTS

| | | | |
|---|---|---|---|
| 922810 | 1/1955 | Germany | 267/64.27 |
| 50241 | 3/1984 | Japan | 267/64.28 |
| 1015010 | 12/1965 | United Kingdom | 267/64.27 |

*Primary Examiner*—Lee Young
*Attorney, Agent, or Firm*—Fattibene and Fattibene; Arthur T. Fattibene; Paul A. Fattibene

[57] ABSTRACT

This disclosure is directed to a fluid actuated spring assembly for supporting a vehicle load which includes an expandable bellows or chamber having a limiting device disposed internally of the expansion chamber to prohibit or limit the overall height to which the expandable chamber may extend. A control valve is operatively connected to the expandable chamber to control the flow of fluid pressure to and from the expandable chamber, and a valve actuator that is responsive to varying load and/or road conditions is provided to automatically operate the valve to control the flow of fluid pressure to and from the expansion chamber so as to maintain the overall height of the expandable chamber substantially constant, irrespective of varying load and/or road conditions.

2 Claims, 3 Drawing Sheets

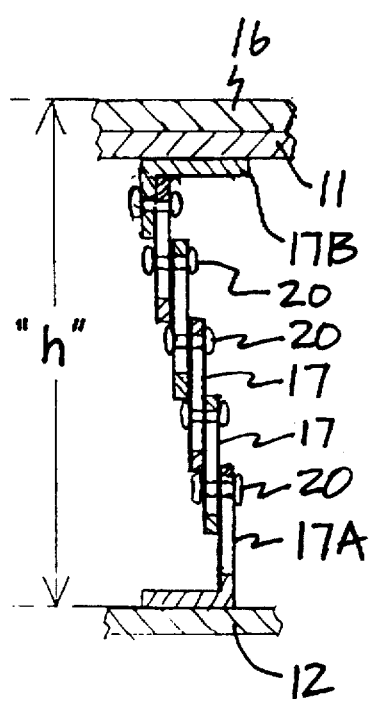
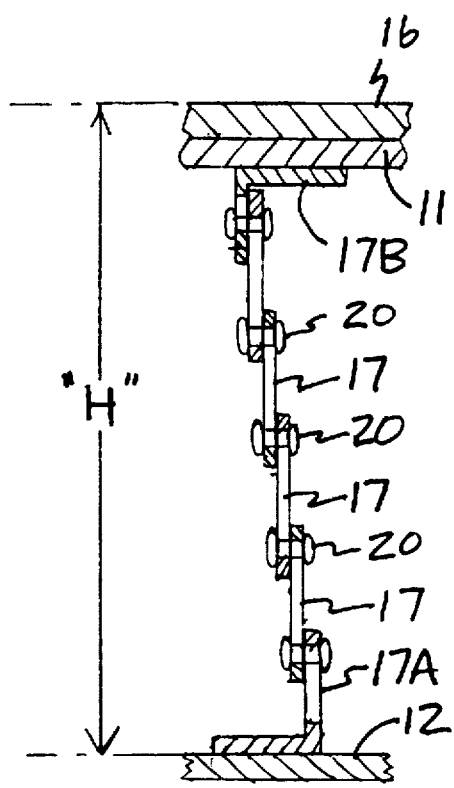
FIG. 3
FIG 4

5,749,566

1

SELF COMPENSATING FLUID SPRING ASSEMBLY

FIELD OF THE INVENTION

This invention generally relates to a fluid spring assembly and more specifically to a fluid actuated spring assembly for resiliently supporting a vehicle load and which is self compensating in accordance with varying load and/or road conditions so that the height of the load is maintained relatively constant.

BACKGROUND OF THE INVENTION

Various air suspension springs have been used in vehicles. However, of the known air suspension springs, each had its limitations and/or was limited to specific applications. Many of the known pneumatic springs are relatively complex in structure and costly to manufacture. Known examples of such pneumatic springs are disclosed in the following U.S. Patents, viz., U.S. Pat. Nos. 3,137,515; 3,227,470; 3,253,840; 3,752,502; 5,388,849; 2,996,312; 3,380,758; 5,199,690; 2,902,291; 2,115,072; 4,722,516; 2,056,106; 4,786,035 and 2,192,355.

The instant invention is an effort to further improve upon and simplify the construction and operation of such fluid spring assemblies.

SUMMARY OF THE INVENTION

An object of this invention is to provide for a self compensating fluid actuated spring assembly for supporting a vehicle load in accordance with varying load and road conditions.

Another object is to provide for a self compensating fluid actuated spring assembly having an internal limiting device to limit the expansion of the air spring in a manner to positively prohibit any expansion of the fluid actuated spring beyond a predetermined height.

Another object is to provide a fluid actuated spring assembly with a control valve responsive to varying load and/or road conditions for controlling the flow of fluid pressure to and from the expandable chamber of the spring assembly.

The foregoing objects and other features and advantages of this invention are attained by a self compensating fluid actuated spring assembly for use in vehicles, e.g. load carrying vehicles such as trucks, tractors, trailers and the like that includes a heavy duty fluid actuated expandable chamber having a limiting device disposed internally of the chamber to limit any excessive expansion of the chamber, and a control valve for directing fluid pressure into and from the expandable chamber for resiliently supporting a load for maintaining a predetermined pressure within the expandable chamber in accordance with varying load and road conditions. A chain of slidably connected links are interconnected between the opposed end surfaces of the expandable chamber to prohibit the expansion of the expandable chamber beyond a predetermined limit.

IN THE DRAWINGS

FIG. 3 is a sectional view taken along section 3—3 on FIG. 1.

FIG. 4 is a sectional view taken along section 4—4 on FIG. 2.

DETAILED DESCRIPTION

Figure 1:
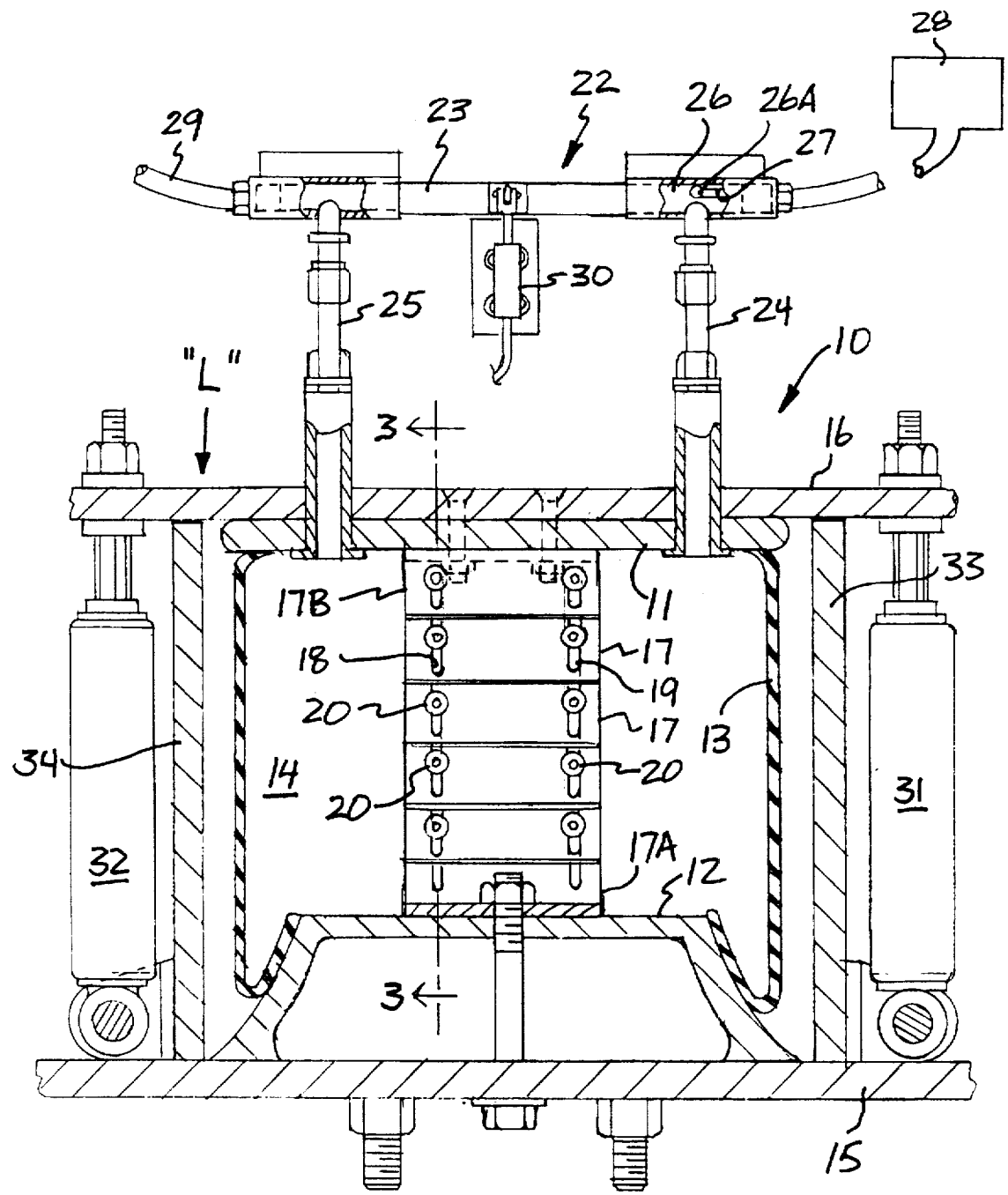
FIG. 1 is a sectional view of a fluid spring assembly embodying the invention illustrating the assembly in a distended position.
Figure 2:
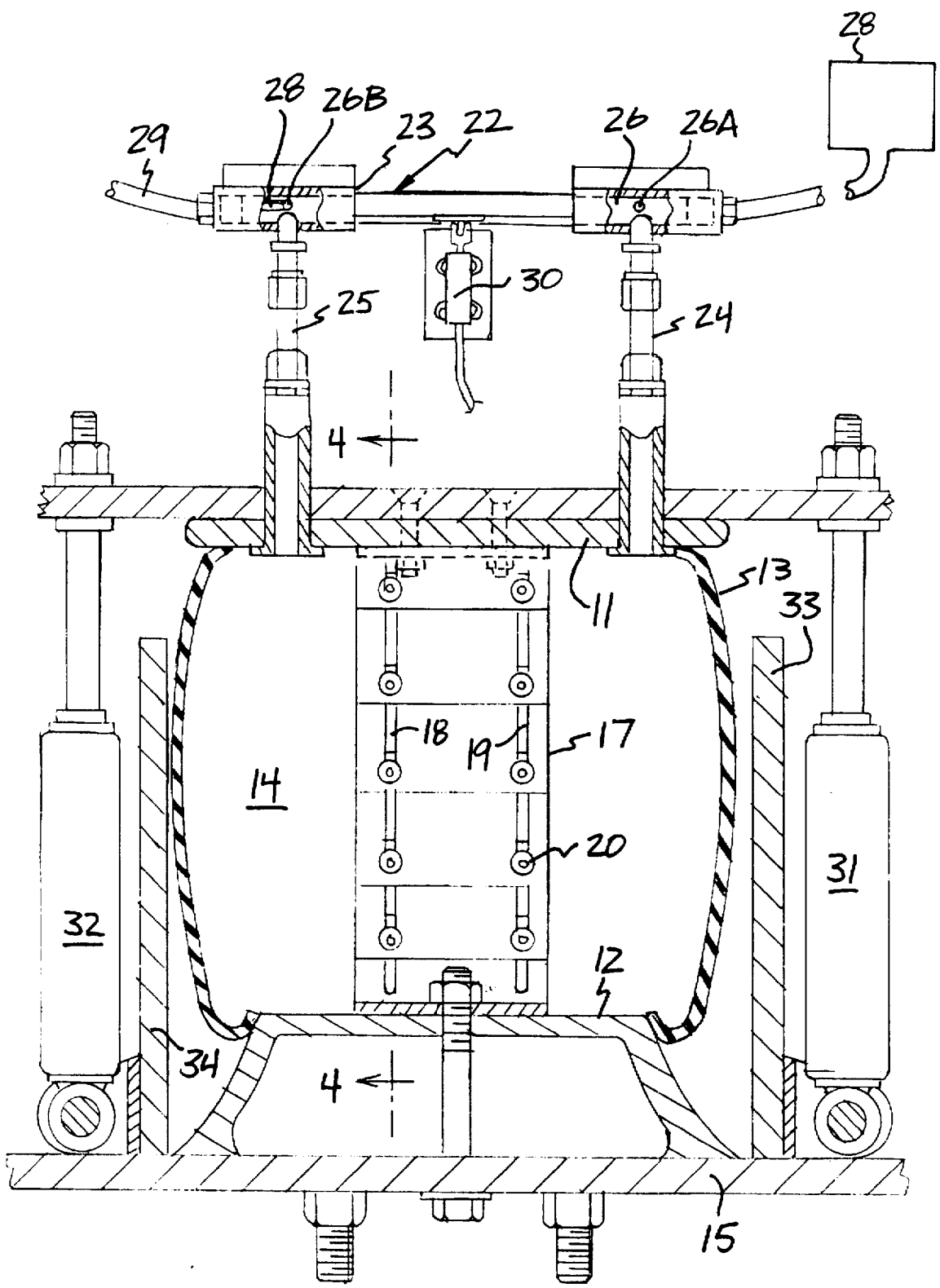
FIG. 2 is a sectional view of the fluid spring assembly of FIG. 1, illustrating the assembly in an expanded position.

Referring to FIGS. 1 and 2, there is shown a fluid actuated spring assembly 10 embodying the present invention. The spring assembly 10 to be described is especially suitable for use on load bearing vehicles such as trucks, tractors, trailers and the like, wherein it is desirable to resiliently support a load while ensuring that height of the load or vehicle is maintained within a predetermined limit or an optimal range. The spring assembly 10 of the present invention may be utilized in a fifth wheel suspension system for a tractor-trailer truck as described in a co-pending application Ser. No. 08/444,214 filed May 18, 1995 entitled "Tractor-Trailer Fifth Wheel Air Suspension Assembly" or as suspension system to compensate for deflections between the wheels of a vehicle relative to the vehicle frame.

The fluid actuated spring assembly 10, as illustrated in FIGS. 1 and 2, includes a pair of opposed mounting surfaces 11 and 12 which are oppositely disposed in spaced relationship and interconnected by a circumscribing tubular wall 13 formed of a heavy duty flexible material such as rubber and the like to define a heavy duty expandable chamber 14. It will be understood that the expandable chamber 14 may also be formed as an integrally formed bellows or cushion constructed entirely of a heavy duty expandable or flexible material.

In the illustrated embodiment, the expansion chamber 14 is supported between the load L or load bearing platform 16 and the chassis 15 of the vehicle. The fluid spring assembly 10 may also be disposed between the wheel axle and the chassis or frame 15 of the vehicle to compensate for varying road conditions or bumps.

Disposed within the expandable chamber 14 is a limiting device to limit any possibility of the expansion chamber 14 to over-extend beyond a predetermined limit for any reason. When the fluid actuated spring 10 is applied to a truck or tractor-trailer vehicle, it is imperative that the overall height of the vehicle be maintained within predetermined limits so as to insure that the vehicle or truck clears any overhead obstruction, e.g. an overhead bridge or the like. Also, the limiting device to be described will guard against any damage to the expandable chamber due to any malfunction which may lead to over-pressurization.

As shown, the limiting device is comprised of a plurality of slidably connected links 17 wherein the endmost links 17A, 17B constitute the anchor links. As shown, the anchor links 17A and 17B are formed as angle members, one leg of which is connected to the adjacent supporting surface 11 or 12 of the expandable chamber 14, and the other leg to the next adjacent intermediate link 17. The intermediate or connecting links 17 are illustrated as connected flat plates having formed therein a pair of laterally spaced elongated slots 18, 19. The elongated slots 18, 19 of the respective links 17 are disposed in alignment with the corresponding slots of the next adjacent link. A stud or bolt 20 is extended through the aligned slots 18, 19 of adjacent links 17 to slidably interconnect adjacent links 17. The endmost links 17A, 17B are similarly connected to the adjacent anchoring links 17. The arrangement is such that the interconnected links 17, 17A and 17B define a chain which will expand or contract as the chamber 14 expands and retracts or collapses. In the event of any over-pressurization of the expandable chamber 14, the expansion is limited by the chain of links 17. Thus, the maximum height "H" of the load or truck cannot be increased more than the overall height of the expandable chamber as determined by the limiting link chain 17, 17A and 17B. During normal operation, the limit of expansion and contraction of the expandable chamber 14 is maintained within predetermined minimum height "h" and maximum expandable height "H" of the fluid spring 10.

FIG. 1 illustrates the fluid actuated spring assembly 10 in its minimum height "h" or contracted position. FIG. 2 illustrates the fluid actuated spring assembly 10 in its maximum expanded height "H" or position as allowed by the chain of links 17, 17A, 17B. Operation of the fluid spring 10 is effected by fluid pressure, e.g. compressed air. A control means 22 is provided for controlling the amount of fluid pressure or compressed air directed to and from the expandable chamber 14 in a manner to maintain the overall height of the load or vehicle substantially constant despite any variance in the load or road conditions.

The control means 22 comprises a valve housing 23 which is interconnected between a fluid inlet 24 and a fluid outlet 25 which are connected in communication with the expandable chamber 14. Rotatably journalled within the valve housing is a rotatable valve or spool 26. The valve 26 is provided with an inlet port 26A which is rotatably into and out of communication with the fluid inlet 26. The inlet port is disposed in communication with a passageway 27 which is connected to a source of fluid pressure 28A, e.g. an air compressor.

The valve 26 is also provided with an outlet port 26B disposed in a rotatable out of phase relationship relative to inlet port 26A. The arrangement is such that when the valve 26 is rotated to place inlet port 26A in communication with the fluid inlet 24, the outlet port 26B is rotated out of communication with the fluid outlet 25. When the valve 26 is rotated to place the outlet port 26B in communication with the fluid outlet 25, the inlet port 26A is rotated out of communication with the fluid inlet 24. The outlet port 26B is disposed in communication with an exhaust passage 28 connected to an exhaust conduit 29.

The actuating means for operating the valve 26 comprises a solenoid 30. The solenoid 30 is operatively connected to suitable sensors (not shown) that sense varying load and/or road conditions and which generates a signal that actuates the solenoid accordingly to control the flow of fluid pressure into and out of the expandable chamber 14 so as to maintain the overall height of the load or vehicle substantially constant.

As shown in FIGS. 1 and 2, a dampening means in the form of shock absorbers 31 and 32 are interposed between the fixed member or chassis 15 and the movable member or platform 16 supporting the load to soften or dampen the relative movement therebetween. Fixed abutments or stops 33, 34 are connected to the chassis 15 to limit the movement of the load toward its minimum overall height "h", as seen in FIG. 1. The connected chain of links 17, 17A and 17B limits the maximum overall height "H" of the load as seen in FIG. 2.

In operation, by controlling the fluid pressure to and from the expandable chamber 14, the overall height of the load or vehicle can be automatically maintained between the minimum and maximum heights as determined by the fixed stops 33, 34 and the chain of links 17, 17A, 17B respectively. Also, in the event of any tendency to over-expand the expandable chamber 14 due to any malfunction, the expansion or height of the chamber 14 is limited by the chain of connected links 17, 17A and 17B.

While the fluid expandable spring assembly has been described as being actuated by compressed air, it is understood that fluid pressure can be effected hydraulically.

While the present invention has been described with respect to a particular embodiment, modifications and variations may be made without departing from the spirit or scope of this invention.

What is claimed is:

1. A self compensating fluid actuated spring assembly for resiliently supporting a vehicle load under variable load and/or road conditions comprising:

a pair of opposed mounting surfaces disposed in spaced relationship, a resilient circumscribing tubular wall interconnected between said opposed mounting surfaces to define an expandable chamber for movement between an extended and distended position in response to load variations and road conditions, limit means disposed within said expandable chamber to limit the extended position of said expandable chamber beyond a predetermined limit, and control means for automatically inflating and deflating said expandable chamber in response to load variations and road conditions, said limiting means comprising a plurality of interconnected links disposed within said expandable chamber to define a chain of connected links, said chain of connected links including a pair of opposed anchor links, each of said anchor links being connected to the mounting surface adjacent thereto, and an intermediate link interconnected between said anchor links, means for slidably interconnecting said links, each of said interconnecting links comprising:

a flat plate, said means for slidably interconnecting said links including a pair of laterally spaced elongated slots so that the elongated slots of one flat plate are axially aligned with the slots of the next adjacent flat plate, and a stud extending through the aligned slots of adjacent flat plates for slidably interconnecting said adjacent flat plates to allow said plate links to extend and distend as said expandable chamber extends and distends within predetermined limits.

2. A self compensating fluid actuated spring assembly for resiliently supporting a vehicle load under varying loads and/or road conditions comprising:

a pair of opposed mounting surfaces disposed in spaced relationship, a resilient tubular wall interconnected between said pair of opposed mounting surfaces defining an expandable chamber capable of expanding and contracting between predetermined limits in accordance with varying load conditions, a fluid inlet and a fluid outlet connected into communication with said expandable chamber, said fluid inlet being connected to a source of fluid pressure, a valve means for controlling the flow of fluid pressure to and from said fluid inlet and outlet respectively for controlling the fluid pressure within said expandable chamber, said valve means including a valve housing connected to said fluid inlet and outlet, a valve member disposed within said valve housing, said valve member having an inlet port and an outlet port, said inlet port being adapted to connect said fluid inlet into and out of communication to a source of fluid pressure, and said outlet port being adapted to connect into and out of communication with said fluid outlet to exhaust the fluid pressure within said chamber therethrough, an actuating means for actuating said valve member between first position whereby said inlet port is disposed in communication with said fluid inlet and said outlet port is disposed out of communication with said fluid outlet and a second position whereby said inlet port is disposed out of communication with said fluid inlet and said outlet port is disposed in communication with said fluid outlet, limiting means disposed within said expandable chamber for preventing the expansion of said chamber beyond a predetermined expanded position, said limiting means including a plurality of slidably interconnected links to define a chain of links, said chain of links including a pair of opposed anchor links, each of said anchor links being connected to an adjacent mounting surface, and at least one intermediate link interconnected between said opposed anchor links, and including means for slidably interconnecting adjacent links, said interconnecting links including a pair of laterally spaced slots formed in each of said links whereby the slots of one link are aligned with the slots of the next adjacent link, and a stud extending through said aligned slots of adjacent links slidably interconnecting adjacent links.

\* \* \* \* \*